Patented June 11, 1929.

1,716,379

UNITED STATES PATENT OFFICE.

GUSTAV LEYSIEFFER, OF TROISDORF, GERMANY.

METHOD OF MANUFACTURING SHEETS, SLABS OR MOLDED ARTICLES FROM CELLULOID OR CELLULOIDLIKE MATERIALS.

No Drawing. Application filed December 7, 1925, Serial No. 73,927, and in Germany December 30, 1924.

In the known method adopted in the manufacture of celluloid or celluloid-like materials, (cellon and the like) the pasty mass obtained from the cellulose compound (nitro-cellulose, acetyl cellulose, ethyl-cellulose) with camphor or camphor substitutes by the use of an excess of volatile solvents, is welded, after the removal of a part of the solvent, on heated rollers under the action of heat and pressure, into a slab of any thickness. Planing machines are then employed for cutting off from this slab, sheets of the desired thickness. In order that it may be easily cut, the slab must still contain a considerable amount of solvents. The latter have to be removed from the cut sheets by drying, which is a very lengthy operation. For instance, a sheet having a thickness of 8 mms. takes 80 days to dry. This constitutes a very great disadvantage owing to the expense entailed, the length of time elapsing before the goods are delivered, the large store-rooms required etc., these factors having to be reckoned with.

The present invention relates to a method of manufacturing sheets even of maximum thickness, the period of time required for drying them being only a fraction of that mentioned above. The surprising discovery has been made that in order to weld the mass in a homogeneous manner to form a massive slab, it is only necessary for it to contain a very small amount of solvents, if only sufficient pressure and suitable temperature are used. Of course it is no longer possible to cut slabs of this kind on the planing machine.

The new method is as follows:

A slab is welded together for instance in the manner usually adopted hitherto and is cut into thin sheets, for example 0,5 mms. thick. These thin sheets are then dried until the greater part of the solvent has evaporated, but enough volatile solvent must still be left to enable a welding to take place under considerable pressure and corresponding temperature. It has been found that this drying only needs a few hours. The thin sheets which have been dried in this manner are then welded together under the action of pressure and heat to form a sheet, block or other molded articles of the desired thickness. During the preliminary heating of the sheets necessary according to this process, and during the welding together itself, a further escape of solvents takes place, so that the resulting sheet only requires to dry for a short time longer, in order to eliminate the residue of solvents.

Having now particularly described and ascertained the nature of my said invention and in what manner the same is to be performed, I declare that what I claim is:—

A method of manufacturing sheets, slabs and molded articles from celluloid and celluloid-like materials consisting of the steps of preparing relatively thin sheets from a relatively larger portion of the same material containing solvent which was present during the formation thereof, removing enough of said solvent from said relatively thin sheets to prevent welding of the same under normal conditions of temperature and pressure but leaving sufficient to permit such welding under raised temperature and pressure conditions, then welding together said sheets in such condition under the action of raised pressure and temperature to form sheets, slabs and molded articles of any desired thickness but containing very little solvent, and finally removing any residual solvent by drying for a short time at a high temperature.

In testimony whereof I have signed my name to this specification.

GUSTAV LEYSIEFFER.